United States Patent
Mansouri et al.

(10) Patent No.: US 11,964,767 B2
(45) Date of Patent: Apr. 23, 2024

(54) NON-INTRUSIVE STATIONARY MONITOR SHROUD

(71) Applicant: Safran Seats USA LLC, Gainesville, TX (US)

(72) Inventors: Reza Mansouri, Costa Mesa, CA (US); Romain Tranier, Costa Mesa, CA (US); Charles Michael Parker, Irvine, CA (US); Amen Omoragbon, Westminster, CA (US); Gokul Ramarathnam, Irvine, CA (US)

(73) Assignee: Safran Seats USA LLC, Gainesville, TX (US)

( * ) Notice: Subject to any disclaimer, the term of this patent is extended or adjusted under 35 U.S.C. 154(b) by 233 days.

(21) Appl. No.: 17/762,299

(22) PCT Filed: Sep. 30, 2019

(86) PCT No.: PCT/US2019/053810
§ 371 (c)(1),
(2) Date: Mar. 21, 2022

(87) PCT Pub. No.: WO2021/066800
PCT Pub. Date: Apr. 8, 2021

(65) Prior Publication Data
US 2022/0332419 A1 Oct. 20, 2022

(51) Int. Cl.
*B64D 11/00* (2006.01)
*B64D 11/06* (2006.01)

(52) U.S. Cl.
CPC .... *B64D 11/00151* (2014.12); *B64D 11/0627* (2014.12); *B64D 11/0638* (2014.12); *B64D 11/064* (2014.12)

(58) Field of Classification Search
CPC .......... B64D 11/00151; B64D 11/0627; B64D 11/0638; B64D 11/064
See application file for complete search history.

(56) References Cited

U.S. PATENT DOCUMENTS

| 8,857,911 | B2 | 10/2014 | Aguirre et al. | |
| 2009/0200422 | A1* | 8/2009 | Johnson | B64D 11/00151 244/118.5 |
| 2014/0159440 | A1 | 6/2014 | Porter | |
| 2017/0283060 | A1* | 10/2017 | Papke | B64D 11/0023 |

FOREIGN PATENT DOCUMENTS

| CN | 108422905 A | 8/2018 | |
| DE | 202004008069 U1 * | 9/2004 | B64D 11/0638 |

OTHER PUBLICATIONS

International Patent Application No. PCT/US2019/053810, International Search Report and Written Opinion, dated May 29, 2020.

* cited by examiner

*Primary Examiner* — Anthony D Barfield
(74) *Attorney, Agent, or Firm* — Kilpatrick Townsend & Stockton LLP

(57) ABSTRACT

A passenger seat assembly can include a seat frame; a seat back supported by the seat frame, comprising a rearward surface, and moveable between a stowed position and a deployed position; and a monitor shroud positioned proximate to the rearward surface of the seat back and fixedly coupled to a stationary surface, wherein the monitor shroud remains stationary as the seat back moves between the stowed position and the deployed position, and the monitor shroud defines an opening that provides access to the rearward surface of the seat back.

20 Claims, 6 Drawing Sheets

NON-INTRUSIVE STATIONARY MONITOR SHROUD

FIELD OF THE INVENTION

The field of the invention relates to non-intrusive stationary shroud assemblies for passenger vehicles such as aircrafts.

BACKGROUND

Inside an airplane, space is very limited and therefore valuable. Airlines aim to optimize how they use the space to ensure they meet their profit goals and to achieve the required density level in economy class. To do this, the area allocated to each seat is typically minimized to be as small as possible to fit an average person, which can be uncomfortable for the passenger, especially for long flights. Conventionally, seat-back shrouds in economy class seats are attached to the rearward facing surface of the seat back of a passenger seat. As a passenger reclines the seat back, the seat-back shroud moves with the seat back and decreases the area of the passenger sitting behind the now-reclined seat back.

Conventional seat-back shrouds in premium class seats may be fixed and separate from the rearward facing surface of the seat back. However, these seat-back shrouds extend from the floor of the airplane or the top of the base frame to the top of the of the seat back and are fully enclosed. So the movement of the seat back has no effect on the area of the passenger sitting behind the seat back.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat assembly includes a seat frame; a seat back supported by the seat frame, comprising a rearward surface, and moveable between a stowed position and a deployed position; and a monitor shroud positioned proximate to the rearward surface of the seat back and fixedly coupled to a stationary surface, wherein the monitor shroud remains stationary as the seat back moves between the stowed position and the deployed position, and the monitor shroud defines an opening that provides access to the rearward surface of the seat back.

In some embodiments, the stationary surface comprises the seat frame, a seat track, a floor surface, a wall surface, a ceiling surface, or an overhead bin surface.

In certain embodiments, the monitor shroud comprises a support member coupled to the stationary surface and a video monitor portion coupled to the support member and positioned proximate to an upper area of the seat back.

The support member, in some embodiments, comprises a first support member and a second support member and the first support member and the second support member are coupled to the seat frame on opposing sides of the seat back.

A tray table, in certain embodiments, is coupled to the monitor shroud.

In some embodiments, at least one of a video monitor screen or a literature pocket is coupled to the monitor shroud.

In certain embodiments, the video monitor screen is pivotally coupled to the monitor shroud.

The video monitor screen, in some embodiments, comprises a plasma display, a liquid crystal display, an organic light-emitting diode display, or a projector.

According to certain embodiments of the present invention, a method of deploying a seat back of a passenger seat, the passenger seat including the seat back moveable between a stowed position and a deployed position, and a stationary monitor shroud positioned proximate to the seat back, the stationary monitor shroud providing an access to the seat back, the method including: deploying the seat back from the stowed position to the deployed position; and increasing an amount of living space of a passenger seat located rearward of the stationary monitor shroud based on the deployed position of the seat back relative to the stationary monitor shroud.

In some embodiments, the stationary monitor shroud comprises a support member coupled to a stationary surface and a video monitor portion coupled to the support member and positioned proximate to an upper area of the seat back.

In certain embodiments, the support member and the video monitor portion defines an opening that provides access to the seat back.

The stationary surface, in some embodiments, comprises a seat frame, a seat track, a floor surface, a wall surface, a ceiling surface, or an overhead bin surface.

At least one of a video monitor screen or a literature pocket, in certain embodiments, is coupled to the stationary monitor shroud.

According to certain embodiments of the present invention, a passenger seat assembly includes a plurality of passenger seats arranged in a row, wherein each passenger seat of the plurality of passenger seats comprises: a seat frame; and a seat back supported by the seat frame, comprising a rearward surface, and moveable between a stowed position and a deployed position; and a monitor shroud positioned proximate to the rearward surface of the seat back of each passenger seat, extending at least partially along the row, and fixedly coupled to a stationary surface, wherein the monitor shroud remains stationary as the seat back moves between the stowed position and the deployed position and the monitor shroud permits access to the rearward surface of the seat back of each passenger seat.

In some embodiments, the monitor shroud extends along the entirety of the row.

In certain embodiments, the stationary surface comprises the seat frame, a seat track, a floor surface, a wall surface, a ceiling surface, or an overhead bin surface.

The monitor shroud, in some embodiments, comprises a support member coupled to the stationary surface and a video monitor portion coupled to the support member and positioned proximate to an upper area of the seat back of each passenger seat.

The support member, in certain embodiments, comprises a first support member and a second support member, the first support member being coupled to the seat frame located closest to an aisle, and the second support member being coupled to the seat frame located closest to a window.

In some embodiments, the first support member, the second support member, and the video monitor portion define an opening that provides access to the rearward surface of the seat back of each passenger seat below the video monitor portion.

In certain embodiments, at least one of a plurality of video monitor screens or a plurality of literature pockets are coupled to the monitor shroud so that at least one of a single video monitor screen or a single literature pocket is positioned proximate to a rearward surface of each passenger seat.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide a non-intrusive stationary shroud for passenger seats that provides access to a rearward surface of the passenger seat. While the stationary shrouds are discussed for use with aircraft seats, they are by no means so limited. Rather, embodiments of the stationary shroud may be used in passenger seats or other seats of any type or otherwise as desired.

Figure 1:
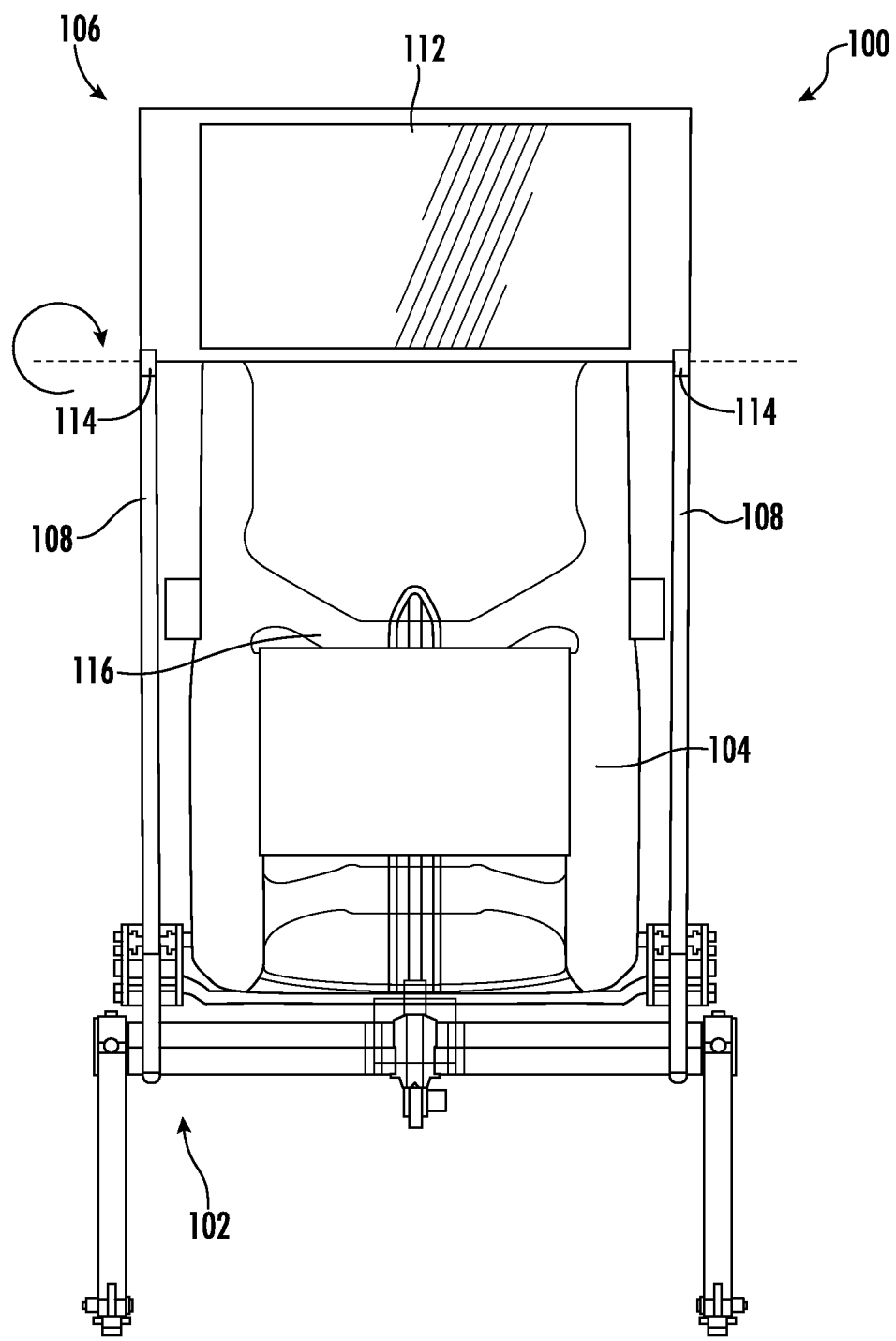
FIG. 1 is a rear view of a passenger seat assembly with a stationary shroud that provides access to a rearward surface of the passenger seat assembly, according to certain embodiments of the present invention.
Figure 2:
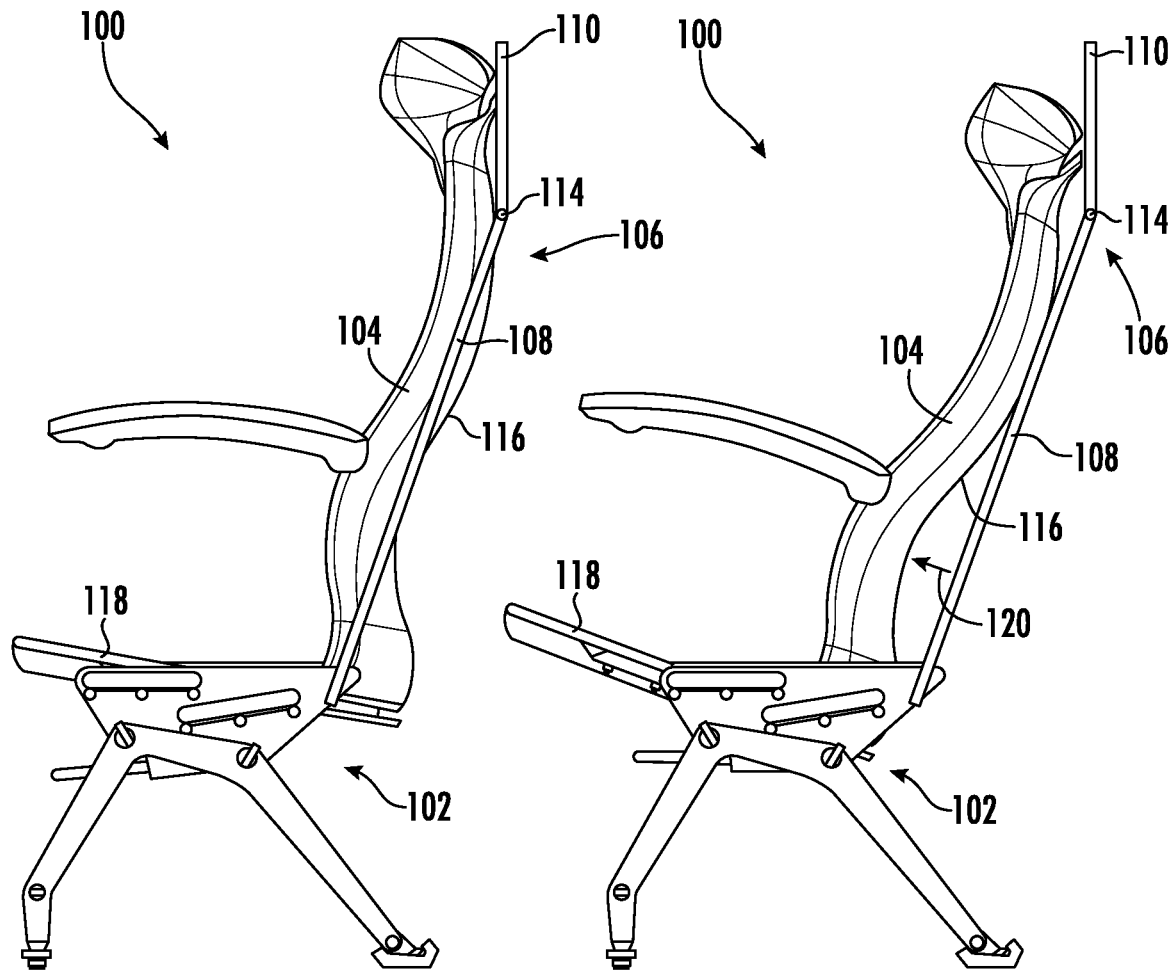
FIG. 2 is a left side view of the seat of FIG. 1 moving from a stowed position to a deployed position.
Figure 3:
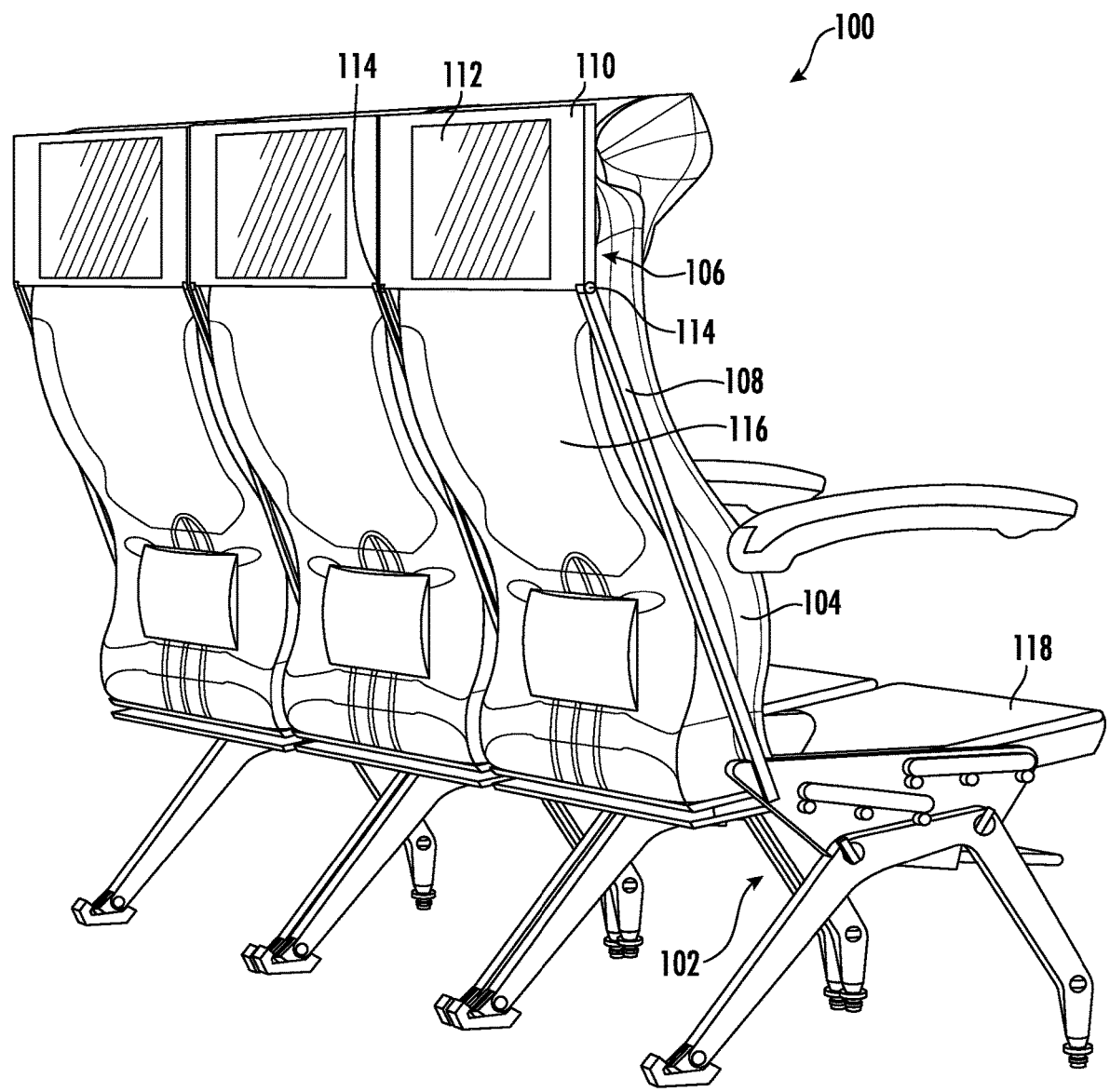
FIG. 3 is a perspective rear view of the seat of FIG. 1 installed in a row of passenger seat assemblies.

According to certain embodiments of the present invention, as shown in FIGS. 1-3, a non-intrusive stationary shroud 106 is part of a passenger seat assembly 100. The passenger seat assembly 100 may include a seat frame 102, a seat back 104, a seat pan 118, and the stationary shroud 106, e.g., a monitor shroud.

The seat frame 102, the seat back 104, the seat pan 118, and the stationary shroud 106 may be formed of materials including but not limited to aluminum, stainless steel, aramid fibers, polycarbonate, polypropylene, other metallic materials, composite materials, or other similar materials. Each of the seat frame 102, the seat back 104, the seat pan 118, and the stationary shroud 106 may be formed from the same material, from different materials, or from a combination of the same and different materials. For example, the seat frame 102 and the seat back 104 may both be formed of aluminum and the stationary shroud 106 may be formed from polycarbonate. In certain embodiments, the seat back 104 and/or the seat pan 118 may be covered by a cushioning material.

In some embodiments, the stationary shroud 106 may include at least one support member 108 and an entertainment portion 110, e.g., a video monitor portion or a literature pocket portion, coupled to the at least one support member 108. The stationary shroud 106 may include at least one of a video monitor screen 112 or a literature pocket coupled to the entertainment portion 110. The video monitor screen 112 may include a plasma display, a liquid crystal display, an organic light-emitting diode display, a projector, or any other suitable screen or device for displaying images. The video monitor screen 112 may be pivotally coupled to the stationary shroud 106 so that a passenger may rotate the video monitor screen 112 and adjust a viewing angle of the video monitor screen 112. Additionally, the stationary shroud 106 may include straps, a ledge, or any other suitable holding mechanism that may secure a personal electronic device to the stationary shroud 106.

Figure 4:
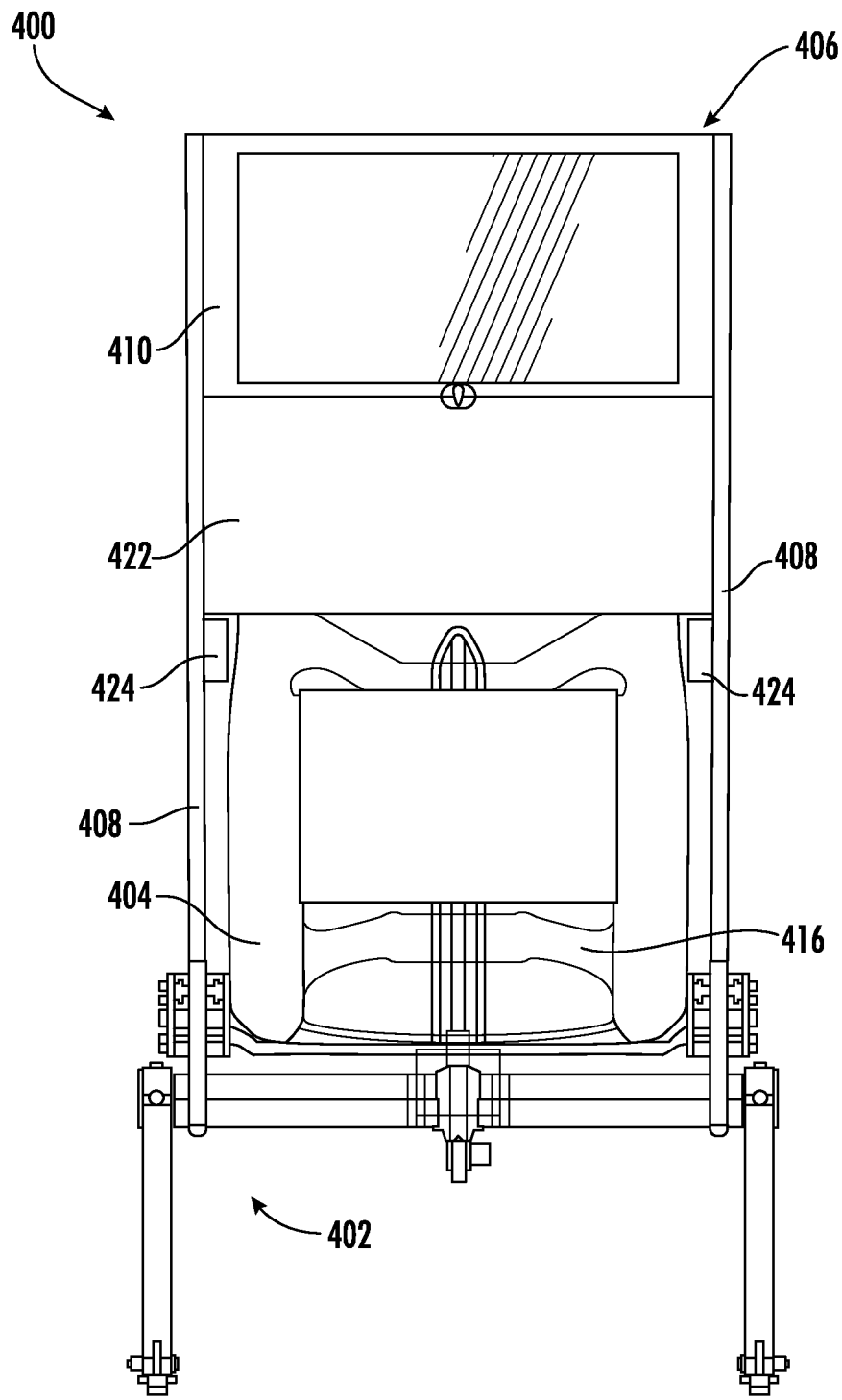
FIG. 4 is a rear view of a passenger seat assembly with a stationary shroud that provides access to a rearward surface of the passenger seat assembly, according to certain embodiments of the present invention.
Figure 5:
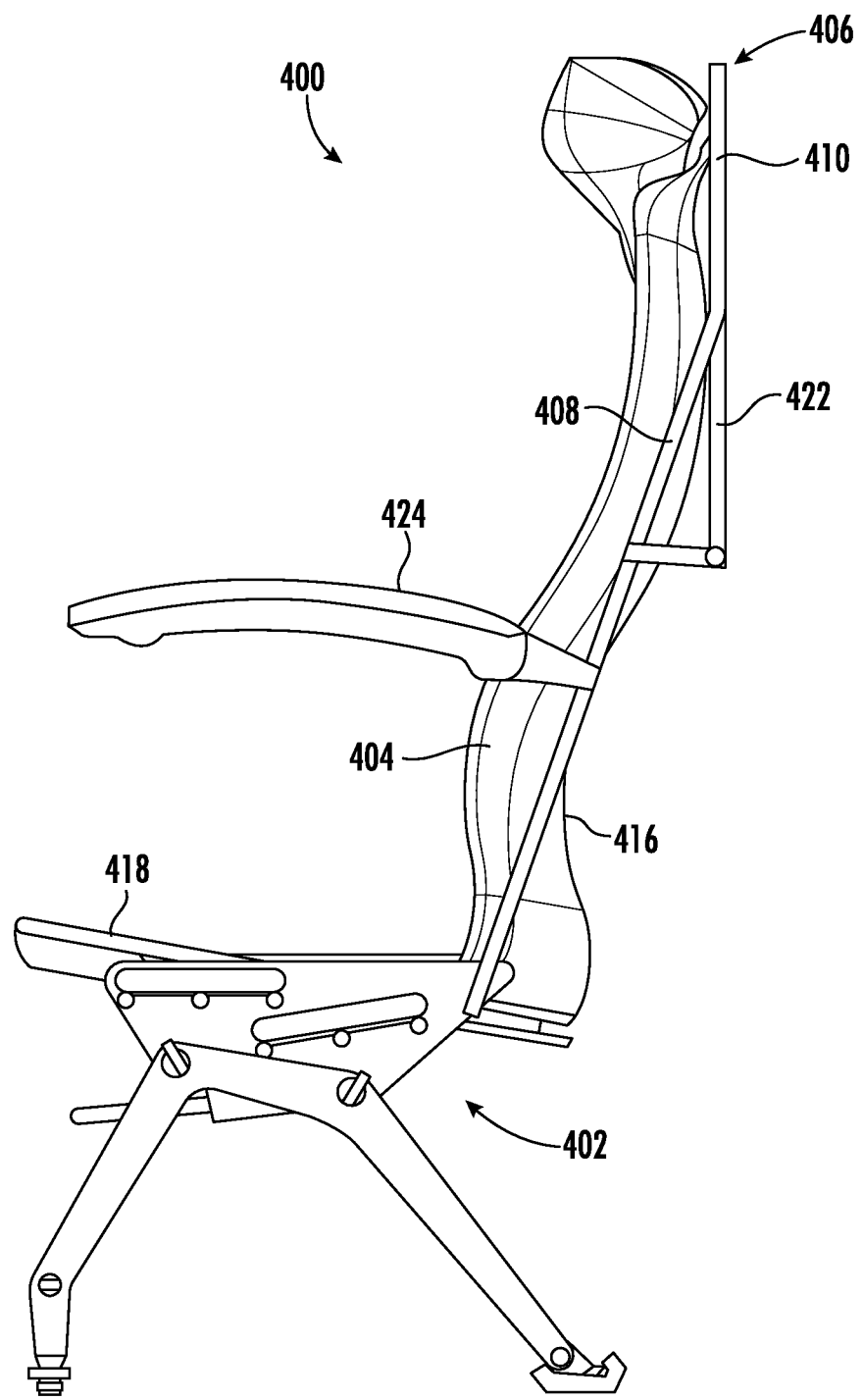
FIG. 5 is a perspective rear view of the seat of FIG. 4.
Figure 6:
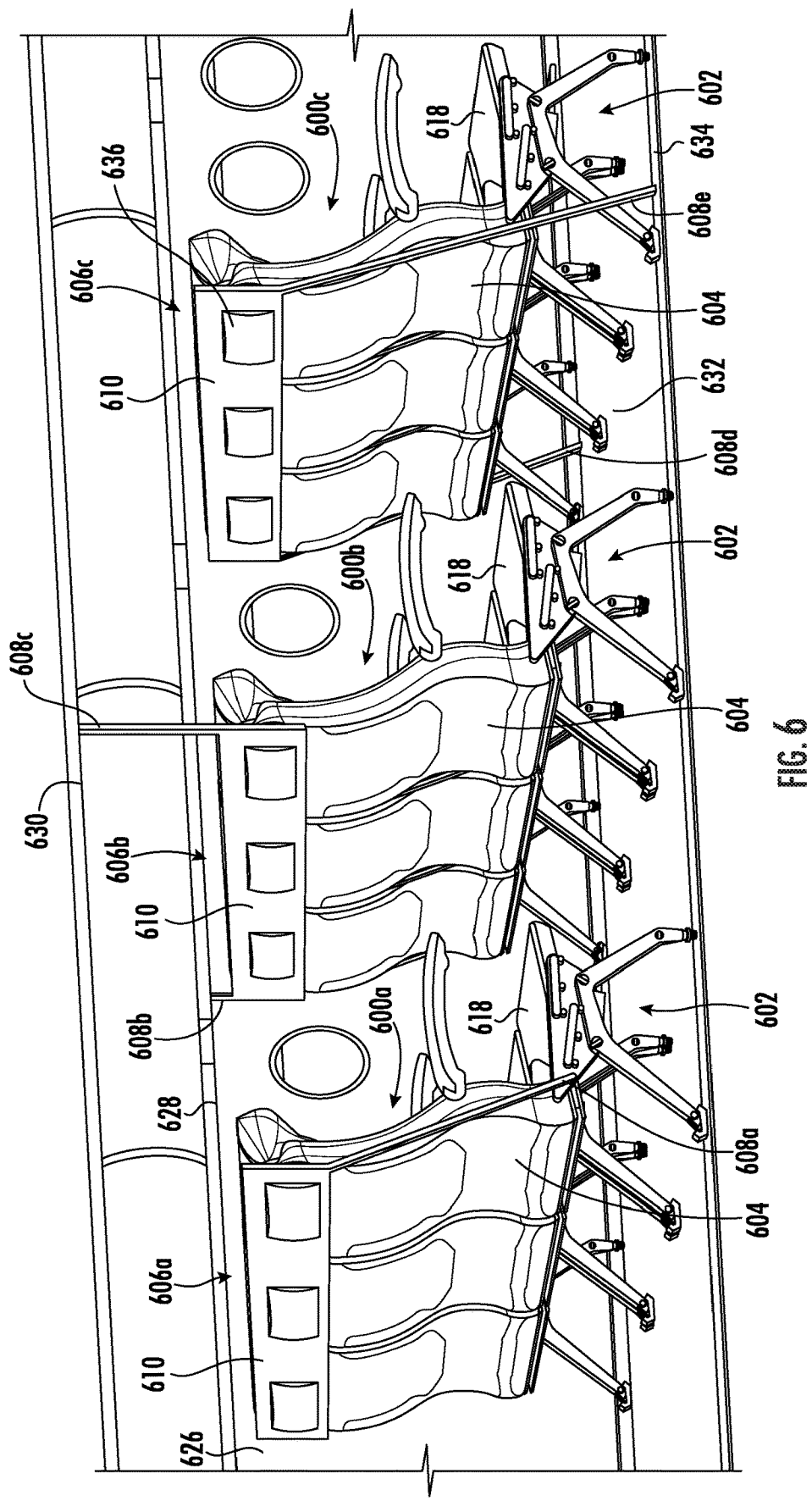
FIG. 6 is a perspective rear view of multiple passenger seat assemblies within a passenger vehicle with a stationary shroud that provides access to a rearward surface of each passenger seat assembly, according to certain embodiments of the present invention.

The entertainment portion 110 may be pivotally coupled to the at least one support member 108, e.g., such as is shown in FIGS. 1-3, or may be fixedly coupled to the at least one support member 108, e.g., such as is shown in FIGS. 4-6. This pivotal coupling may permit the angle of the entertainment portion 110 to be adjusted relative to the at least one support member 108. For example, a passenger may adjust the viewing angle of a non-pivotally coupled video monitor screen 112 by rotating the entertainment portion 110. In some embodiments, the entertainment portion 110 may be pivotally coupled to the at least one support member 108 using at least one pivot 114. As non-limiting examples, the at least one pivot 114 may be or include a hinge, a ball and socket connection, or any other suitable connection that permits rotational movement.

In some embodiments, the seat back 104 may be supported by the seat frame 102, and the seat frame 102 may be coupled with a seat track fitting to secure the seat frame 102, and thus the passenger seat assembly 100, to the floor of the passenger vehicle. The seat back 104 may include a rearward surface 116, which is opposite the forward surface that a passenger sitting in the passenger seat assembly 100 comes into contact with.

In some embodiments (such as is shown in FIG. 2), the seat back 104 may be movable between a stowed position, or a substantially upright position, and a deployed position, or a substantially reclined position. In some embodiments, the seat back 104 may be fixedly coupled to the seat pan 118 such that when the seat back 104 is moved from a stowed position to a deployed position, or vice versa, the seat back 104 and the seat pan 118 move together through a cradle or rocking motion that includes the simultaneous translation and rotation of the seat back 104 and the seat pan 118. In further embodiments, the seat back 104 may be pivotally coupled to the seat pan 118 such that the seat back 104 may be moved between the stowed position and the deployed position by rotating the seat back 104 relative to the seat pan 118 as the seat pan 118 remains stationary.

In some embodiments, the stationary shroud 106 is fixedly attached to any suitable stationary surface found within the passenger vehicle. For example, the stationary shroud 106 may be fixedly attached to the seat frame 102, the seat track, a floor surface, a wall surface, a ceiling surface, an overhead bin surface, etc. To form the fixed attachment, the stationary shroud 106 may be integrally formed with the stationary surface, e.g., the seat frame 102, or may be secured to the stationary surface, e.g., the seat frame 102, using any suitable attachment, e.g., screws, nuts and bolts, glue, sealant, a snap-fit design, a friction-fit design, welding, melting, etc. Because of this fixed attachment of the stationary shroud 106 to the stationary surface, the stationary shroud 106 does not move as the seat back 104 moves between a deployed position and a stowed position.

The stationary shroud 106 may be fixedly attached to the seat frame 102 and positioned proximate to, but separate from, the rearward surface 116 of the seat back 104. In some embodiments, the entertainment portion 110 may be positioned proximate to an upper area of the seat back 104, e.g., an area substantially behind a headrest area of the passenger seat assembly 100, and the at least one support member 108 may be coupled to the stationary surface.

In some embodiments, the stationary shroud 106 is positioned and attached to the stationary surface, e.g., the seat frame 102, so that the stationary shroud 106 permits access to the rearward surface of the seat back 104. For example, the stationary shroud 106 may include two support members 108, a first support member and a second support member, that each extend from the entertainment portion 110 and attach to the seat frame 102 on opposite sides of the seat back 104 as is illustrated in FIGS. 1 and 3-4. For example, the first support member may attach to the seat frame 102 on the side of the seat back 104 closest to an aisle while the second support member may attach to the seat frame 102 on the side of the seat back 104 closest to a window. In such embodiments, the stationary shroud 106 defines an opening between the two support members 108 and the entertainment portion 110 that provides access to the rearward surface 116 of the seat back 104.

In some embodiments, deploying the seat back 104 from the stowed position to the deployed position will cause the rearward surface 116 to move from being positioned substantially behind the at least one support member 108 to being positioned substantially in front of the at least one support member 108, such as is shown in FIG. 2. By providing access to the rearward surface 116 of the seat back 104, the amount of living space allocated to the passenger seat located rearward of the stationary shroud 106 may be increased, as shown using arrow 120 in FIG. 2, as the seat back 104 moves from a stowed position to a deployed position. The living space may be defined as the open space available to each passenger seat assembly, e.g., the open space that is available to a passenger sitting in a passenger seat.

In some embodiments (such as is shown in FIGS. 4-5), a stationary shroud 406 is part of a passenger seat assembly 400. The passenger seat assembly 400 may be similar to or the same as, or include similar or the same elements as, the passenger seat assembly 100 discussed above with respect to FIGS. 1-3. For example, the passenger seat assembly 400 may include a seat frame 402, a seat back 404, a seat pan 418, and the stationary shroud 406, e.g., a monitor shroud.

In some embodiments, the stationary shroud 406 may include at least one support member 408 and an entertainment portion 410, e.g., a video monitor portion or a literature pocket portion, coupled to the at least one support member 408. The entertainment portion 410 may be pivotally coupled to the at least one support member 408, as was previously discussed with respect to FIGS. 1-3, or the entertainment portion 410 may be fixedly coupled to the at least one support member 408 so that the entertainment portion 410 may not move relative to the at least one support member 408. For example the entertainment portion 410 and the at least one support member 408 may be integrally formed with one another or may be formed separately and attached using any suitable attachment, e.g., screws, nuts and bolts, glue, sealant, a snap-fit design, a friction-fit design, welding, melting, etc.

In some embodiments, in addition to the at least one support member 408 and the entertainment portion 410, the stationary shroud 406 may include a tray table 422 and at least one armrest 424. For example, the tray table 422 may be attached to and deployable from the at least one support member 408 and/or the entertainment portion 410. In some embodiments, the tray table 422 is attached to the stationary shroud 406 and is completely separate from the seat back 404. Additionally, the at least one armrest 424 may be coupled to or formed with the at least one support member 408.

In some embodiments (such as is shown in FIG. 6), a stationary shroud 606a-c is part of a passenger seat assembly 600a-c. Each passenger seat assembly 600a-c may be similar to or the same as, or include similar or the same elements as, the passenger seat assemblies 100 and 400 discussed above with respect to FIGS. 1-5. For example, Each passenger seat assembly 600a-c may include a seat frame 602, a seat back 604, a seat pan 618, and the stationary shroud 606a-c, e.g., a monitor shroud.

In some embodiments, each passenger seat assembly 600a-c may include a plurality of individual passenger seats arranged in a row. For example, the passenger seat assembly 600a-c may include three individual passenger seats. Each individual passenger seat of the plurality of passenger seats may include the seat frame 602, the seat back 604, and the seat pan 618.

Each stationary shroud 606a-c may include at least one support member 608a-e and an entertainment portion 610. In certain embodiments, each stationary shroud 606a-c may include only an entertainment portion 610. The entertainment portion 610 may include at least one of a literature pocket 636 or a video monitor screen 112, as discussed above with respect to FIGS. 1-5. The number of literature pockets 636 or video monitor screens 112 coupled with the entertainment portion 610 of each stationary shroud 606a-c may correspond to the number of individual passenger seats included in each passenger seat assembly 600a-c. For example, the passenger seat assembly 600a includes three individual passenger seats and three literature pockets 636. However, in certain embodiments, the number of literature pockets 636 or video monitor screens 112 coupled with the entertainment portion 610 may differ from the number of individual passenger seats included in each passenger seat assembly 600a-c. Additionally, while the stationary shrouds 606a-c are shown with only literature pockets 636 attached to the stationary shrouds 606a-c, any combination of literature pockets 636, video monitor screens 112, or other suitable entertainment elements may be attached to the stationary shrouds 606a-c.

In some embodiments, the stationary shroud 606a-c may be positioned proximate to, but separate from, the rearward surface of the seat back 604. Additionally, each stationary shroud 606a-c may extend at least partially along the row of individual passenger seats or may extend along the entirety of the row of individual passenger seats. Each stationary shroud 606a-c may be fixedly coupled to any suitable stationary surface.

For example, the stationary shroud 606a may be fixedly attached to a wall surface 626 on the side of the passenger seat assembly 600a that is closest to the windows and may be fixedly attached to the seat frame 602 via the support member 608a on the side of the passenger seat assembly 600a that is closest to the aisle. The stationary shroud 606b may be fixedly attached to an overhead bin surface 628 via the support member 608b on the side of the passenger seat assembly 600b that is closest to the windows and may be fixedly attached to a ceiling surface 630 via the support member 608c on the side of the passenger seat assembly 600b that is closest to the aisle. The stationary shroud 606c may be fixedly attached to a floor surface 632 via the support member 608d on the side of the passenger seat assembly 600c that is closest to the windows and may be fixedly attached to a seat track fitting 634 via the support member 608e on the side of the passenger seat assembly 600c that is closest to the aisle.

Each stationary shroud 606a-c may provide access to the seat back 604 of each individual passenger seat in each respective row. Therefore, as each seat back 604 is moved from the stowed position to the deployed position, the amount of living space allocated to each passenger seat located rearward of the deployed seat back 604 may be increased. This increased living space may be utilized by a passenger sitting in the passenger seat located rearward of the deployed seat back 604 and may increase the level of comfort experienced by the passenger.

In the following, further examples are described to facilitate the understanding of the invention:

Example #1. A passenger seat assembly (which may incorporate features of any of the subsequent examples) comprising: a seat frame; a seat back supported by the seat frame, comprising a rearward surface, and moveable between a stowed position and a deployed position; and a monitor shroud positioned proximate to the rearward surface of the seat back and fixedly coupled to a stationary surface, wherein the monitor shroud remains stationary as the seat back moves between the stowed position and the deployed position, and the monitor shroud defines an opening that provides access to the rearward surface of the seat back.

Example #2. The passenger seat assembly of example #1 or any of the preceding or subsequent examples, wherein the stationary surface comprises the seat frame, a seat track, a floor surface, a wall surface, a ceiling surface, or an overhead bin surface.

Example #3. The passenger seat assembly of example #1 or any of the preceding or subsequent examples, wherein the monitor shroud comprises a support member coupled to the stationary surface and a video monitor portion coupled to the support member and positioned proximate to an upper area of the seat back.

Example #4. The passenger seat assembly of example #3 or any of the preceding or subsequent examples, wherein the support member comprises a first support member and a second support member and the first support member and the second support member are coupled to the seat frame on opposing sides of the seat back.

Example #5. The passenger seat assembly of example #1 or any of the preceding or subsequent examples, wherein a tray table is coupled to the monitor shroud.

Example #6. The passenger seat assembly of example #1 or any of the preceding or subsequent examples, wherein at least one of a video monitor screen or a literature pocket is coupled to the monitor shroud.

Example #7. The passenger seat assembly of example #6 or any of the preceding or subsequent examples, wherein the video monitor screen is pivotally coupled to the monitor shroud.

Example #8. The passenger seat assembly of example #6 or any of the preceding or subsequent examples, wherein the video monitor screen comprises a plasma display, a liquid crystal display, an organic light-emitting diode display, or a projector.

Example #9. A method (which may incorporate features of any of the subsequent examples) of deploying a seat back of a passenger seat, the passenger seat comprising the seat back moveable between a stowed position and a deployed position, and a stationary monitor shroud positioned proximate to the seat back, the stationary monitor shroud providing an access to the seat back, the method comprising: deploying the seat back from the stowed position to the deployed position; and increasing an amount of living space of a passenger seat located rearward of the stationary monitor shroud based on the deployed position of the seat back relative to the stationary monitor shroud.

Example #10. The method of example #9 or any of the preceding or subsequent examples, wherein the stationary monitor shroud comprises a support member coupled to a stationary surface and a video monitor portion coupled to the support member and positioned proximate to an upper area of the seat back.

Example #11. The method of example #10 or any of the preceding or subsequent examples, wherein the support member and the video monitor portion defines an opening that provides access to the seat back.

Example #12. The method of example #10 or any of the preceding or subsequent examples, wherein the stationary surface comprises a seat frame, a seat track, a floor surface, a wall surface, a ceiling surface, or an overhead bin surface.

Example #13. The method of example #9 or any of the preceding or subsequent examples, wherein at least one of a video monitor screen or a literature pocket is coupled to the stationary monitor shroud.

Example #14. A passenger seat assembly (which may incorporate features of any of the subsequent examples) comprising: a plurality of passenger seats arranged in a row, wherein each passenger seat of the plurality of passenger seats comprises: a seat frame; and a seat back supported by the seat frame, comprising a rearward surface, and moveable between a stowed position and a deployed position; and a monitor shroud positioned proximate to the rearward surface of the seat back of each passenger seat, extending at least partially along the row, and fixedly coupled to a stationary surface, wherein the monitor shroud remains stationary as the seat back moves between the stowed position and the deployed position and the monitor shroud permits access to the rearward surface of the seat back of each passenger seat.

Example #15. The passenger seat assembly of example #14 or any of the preceding or subsequent examples, wherein the monitor shroud extends along the entirety of the row.

Example #16. The passenger seat assembly of example #14 or any of the preceding or subsequent examples, wherein the stationary surface comprises the seat frame, a seat track, a floor surface, a wall surface, a ceiling surface, or an overhead bin surface.

Example #17. The passenger seat assembly of example #14 or any of the preceding or subsequent examples, wherein the monitor shroud comprises a support member coupled to the stationary surface and a video monitor portion coupled to the support member and positioned proximate to an upper area of the seat back of each passenger seat.

Example #18. The passenger seat assembly of example #17 or any of the preceding or subsequent examples, wherein the support member comprises a first support member and a second support member, the first support member being coupled to the seat frame located closest to an aisle, and the second support member being coupled to the seat frame located closest to a window.

Example #19. The passenger seat assembly of example #18 or any of the preceding or subsequent examples, wherein the first support member, the second support member, and the video monitor portion define an opening that provides access to the rearward surface of the seat back of each passenger seat below the video monitor portion.

Example #20. The passenger seat assembly of example #14 or any of the preceding or subsequent examples, wherein at least one of a plurality of video monitor screens or a plurality of literature pockets are coupled to the monitor shroud so that at least one of a single video monitor screen or a single literature pocket is positioned proximate to a rearward surface of each passenger seat.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat assembly comprising:
   a seat frame;
   a seat back supported by the seat frame, comprising a rearward surface, and moveable between a stowed position and a deployed position; and
   a monitor shroud positioned proximate to the rearward surface of the seat back and comprising a support member fixedly coupled to a stationary surface, wherein the monitor shroud remains stationary as the seat back moves between the stowed position and the deployed position, and the monitor shroud defines an opening that provides access to the rearward surface of the seat back;
   wherein the rearward surface is positioned substantially behind the support member in the stowed position and is positioned substantially in front of the support member in the deployed position.

2. The passenger seat assembly of claim 1, wherein the stationary surface comprises the seat frame, a seat track, a floor surface, a wall surface, a ceiling surface, or an overhead bin surface.

3. The passenger seat assembly of claim 1, wherein the monitor shroud further comprises a video monitor portion coupled to the support member and positioned proximate to an upper area of the seat back.

4. The passenger seat assembly of claim 1, wherein the support member comprises a first support member and a second support member and the first support member and the second support member are coupled to the seat frame on opposing sides of the seat back.

5. The passenger seat assembly of claim 1, wherein a tray table is coupled to the monitor shroud.

6. The passenger seat assembly of claim 1, wherein at least one of a video monitor screen or a literature pocket is coupled to the monitor shroud.

7. The passenger seat assembly of claim 6, wherein the video monitor screen is pivotally coupled to the monitor shroud.

8. The passenger seat assembly of claim 6, wherein the video monitor screen comprises a plasma display, a liquid crystal display, an organic light-emitting diode display, or a projector.

9. A method of deploying a seat back of a passenger seat, the passenger seat comprising the seat back moveable between a stowed position and a deployed position, and a stationary monitor shroud positioned proximate to the seat back and comprising a support member, the stationary monitor shroud providing an access to the seat back, the method comprising:
   deploying the seat back from the stowed position to the deployed position, wherein a rearward surface of the seat back is positioned substantially behind the support member in the stowed position and is positioned substantially in front of the support member in the deployed position; and
   increasing an amount of living space of a passenger seat located rearward of the stationary monitor shroud based on the deployed position of the seat back relative to the stationary monitor shroud.

10. The method of claim 9, wherein the support member is coupled to a stationary surface and the monitor shroud further comprises a video monitor portion coupled to the support member and positioned proximate to an upper area of the seat back.

11. The method of claim 10, wherein the support member and the video monitor portion defines an opening that provides the access to the seat back.

12. The method of claim 10, wherein the stationary surface comprises a seat frame, a seat track, a floor surface, a wall surface, a ceiling surface, or an overhead bin surface.

13. The method of claim 9, wherein at least one of a video monitor screen or a literature pocket is coupled to the stationary monitor shroud.

14. A passenger seat assembly comprising:
   a plurality of passenger seats arranged in a row, wherein each passenger seat of the plurality of passenger seats comprises:
   a seat frame; and
   a seat back supported by the seat frame, comprising a rearward surface, and moveable between a stowed position and a deployed position; and
   a monitor shroud positioned proximate to the rearward surface of the seat back of each passenger seat, extending at least partially along the row, and comprising a support member fixedly coupled to a stationary surface, wherein the monitor shroud remains stationary as the seat back moves between the stowed position and the deployed position and the monitor shroud permits access to the rearward surface of the seat back of each passenger seat;
   wherein the rearward surface is positioned substantially behind the support member in the stowed position and is positioned substantially in front of the support member in the deployed position.

15. The passenger seat assembly of claim 14, wherein the monitor shroud extends along the entirety of the row.

16. The passenger seat assembly of claim 14, wherein the stationary surface comprises the seat frame, a seat track, a floor surface, a wall surface, a ceiling surface, or an overhead bin surface.

17. The passenger seat assembly of claim 14, wherein the monitor shroud further comprises a video monitor portion coupled to the support member and positioned proximate to an upper area of the seat back of each passenger seat.

18. The passenger seat assembly of claim 14, wherein the support member comprises a first support member and a second support member, the first support member being coupled to the seat frame located closest to an aisle, and the second support member being coupled to the seat frame located closest to a window.

19. The passenger seat assembly of claim 18, wherein the first support member, the second support member, and the video monitor portion define an opening that provides access to the rearward surface of the seat back of each passenger seat below the video monitor portion.

20. The passenger seat assembly of claim 14, wherein at least one of a plurality of video monitor screens or a plurality of literature pockets are coupled to the monitor shroud so that at least one of a single video monitor screen or a single literature pocket is positioned proximate to each passenger seat.

\* \* \* \* \*